US012108477B2

(12) United States Patent
Liu et al.

(10) Patent No.: US 12,108,477 B2
(45) Date of Patent: Oct. 1, 2024

(54) WIRELESS COMMUNICATION METHOD, APPARATUS, AND SYSTEM

(71) Applicant: HUAWEI TECHNOLOGIES CO., LTD., Shenzhen (CN)

(72) Inventors: Yuanyuan Liu, Beijing (CN); Xinsheng Wang, Shenzhen (CN); Hongqiang Chen, Beijing (CN); Lei Han, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 389 days.

(21) Appl. No.: 17/669,792

(22) Filed: Feb. 11, 2022

(65) Prior Publication Data

US 2022/0167453 A1   May 26, 2022

Related U.S. Application Data

(63) Continuation of application No. PCT/CN2019/100866, filed on Aug. 15, 2019.

(51) Int. Cl.
*H04W 76/19* (2018.01)
*H04W 24/10* (2009.01)
(Continued)

(52) U.S. Cl.
CPC ........... *H04W 76/19* (2018.02); *H04W 24/10* (2013.01); *H04W 76/15* (2018.02); *H04W 76/20* (2018.02)

(58) Field of Classification Search
CPC ..... H04W 76/00; H04W 76/15; H04W 76/18; H04W 76/19; H04W 76/20; H04W 76/30;
(Continued)

(56) References Cited

U.S. PATENT DOCUMENTS 10,631,353 B2 *   4/2020   Shih .................... H04W 72/231
10,999,885 B1 *   5/2021   Shih ....................... H04W 76/19
(Continued)

FOREIGN PATENT DOCUMENTS

CN   109429263 A   3/2019
CN   109429323 A   3/2019
(Continued)

OTHER PUBLICATIONS

3GPP TS 36.331 V15.6.0 (Jun. 2019), 3rd Generation Partnership Project; Technical Specification Group Radio Access Network; Evolved Universal Terrestrial Radio Access (E-UTRA); Radio Resource Control (RRC); Protocol specification (Release 15), total 960 pages.
(Continued)

*Primary Examiner* — Kevin D Mew
(74) *Attorney, Agent, or Firm* — Rimon PC

(57) ABSTRACT

This application discloses a wireless communication method, apparatus, and system, to ensure service quality of terminal communication in a non-standalone (NSA) networking architecture. The wireless communication method includes starting, by a terminal, radio resource control (RRC) connection establishment with a new radio (NR) cell based on an indication of a network device, and starting a timer based on a quantity of RRC connection establishment failures of the NR cell. The timer is set to a first duration. Within the first duration, when the network device indicates to the terminal to report measurement results of the NR cell and another cell, the terminal only reports the measurement result of the other cell, not the measurement result of the NR cell.

20 Claims, 8 Drawing Sheets

(51) Int. Cl.
*H04W 76/15* (2018.01)
*H04W 76/20* (2018.01)

(58) Field of Classification Search
CPC ..... H04W 76/34; H04W 76/38; H04W 24/00; H04W 24/10
See application file for complete search history.

(56) References Cited

U.S. PATENT DOCUMENTS

| | | | |
|---|---|---|---|
| 2013/0122918 A1 | 5/2013 | Boley et al. | |
| 2013/0223205 A1 | 8/2013 | Chuang | |
| 2017/0311290 A1* | 10/2017 | Adjakple | H04W 76/18 |
| 2018/0199163 A1* | 7/2018 | Chen | H04W 48/14 |
| 2019/0215863 A1* | 7/2019 | Kim | H04W 36/06 |
| 2020/0260311 A1* | 8/2020 | Jung | H04W 24/10 |
| 2020/0344019 A1* | 10/2020 | Da Silva | H04W 24/10 |
| 2021/0022055 A1* | 1/2021 | Tseng | H04W 72/02 |
| 2021/0211956 A1* | 7/2021 | Kim | H04W 36/08 |
| 2021/0307100 A1* | 9/2021 | Talebi Fard | H04W 76/18 |

FOREIGN PATENT DOCUMENTS

| | | | |
|---|---|---|---|
| EP | 2993932 A1 | 3/2016 | |
| WO | 2021026401 A1 | 2/2021 | |
| WO | WO-2021138662 A1 * | 7/2021 | ...... H04W 36/00837 |

OTHER PUBLICATIONS

3GPP TS 38.331 V15.6.0 (Jun. 2019), 3rd Generation Partnership Project; Technical Specification Group Radio Access Network; NR; Radio Resource Control (RRC) Protocol Specification (Release 15), total 519 pages.

* cited by examiner

WIRELESS COMMUNICATION METHOD, APPARATUS, AND SYSTEM

CROSS-REFERENCE TO RELATED APPLICATIONS

This application is a continuation of International Application No. PCT/CN2019/100866, filed on Aug. 15, 2019. the disclosure of which is hereby incorporated by reference in its entirety.

TECHNICAL FIELD

This application relates to the field of communication technologies, and specifically, to a wireless communication method, apparatus, and system.

BACKGROUND

In discussions of a fifth generation (5G) communication technology in the 3rd generation partnership project (3GPP) technical specification, 5G and 4th generation (4G) communication interoperability solutions including standalone (SA) networking, non-standalone (NSA) networking, and the like are proposed based on factors such as deployment costs, time, and service experience. In the SA networking solution, 5G new radio (NR) directly accesses a 5G core network. 5G control signaling is completely independent of a 4G network, and coordination between a 5G network and the 4G network is implemented through core network interoperability. In the NSA networking solution, the 5G control signaling is anchored to a 4G base station, and an evolved packet core (EPC) or a next generation core (NGC) of a 5G communication system is accessed by using the 4G base station.

NSA networking supports dual connectivity features such as evolved universal terrestrial radio access (E-UTRA) and a new radio dual connectivity (EN-DC). Compared with SA networking, the NSA networking is more likely to have a network compatibility issue. For example, after the EN-DC is established in a normal long term evolution (LTE) cell, an LTE service can no longer be normally provided, and service quality of terminal communication is poor.

Therefore, in the NSA networking architecture, how to achieve the service quality of the terminal communication may be worth studying.

SUMMARY

With reference to a plurality of implementations, this application provides a wireless communication method, apparatus, and system, to achieve service quality of terminal communication in an NSA networking architecture.

It should be understood that the method in embodiments of this application may be performed by a wireless communication apparatus. The wireless communication apparatus may be an entire computing device, or may be some components in the computing device. For example, a chip related to a wireless communication function such as a system chip or a communication chip. The system chip is also referred to as a system-on-a-chip, or is referred to as a SoC chip. The wireless communication apparatus may be a terminal such as a smartphone, or may be a system chip or a communication chip that may be disposed in the terminal. The communication chip may include one or more of a radio frequency processing chip and a baseband processing chip. The baseband processing chip is also sometimes referred to as a modem or a baseband processor. In an implementation, the communication chip may be integrated into the SoC chip, or may not be integrated into the SoC chip. For example, the baseband processing chip is integrated into the SoC chip, but the radio frequency processing chip is not integrated into the SoC chip.

According to a first aspect, embodiments of this application provides a wireless communication method, including: receiving a first radio resource control (RRC) connection reconfiguration (RRCConnectionReconfiguration) message, where the first RRC connection reconfiguration message includes a new radio (NR) secondary cell group configuration (nr-SecondaryCellGroupConfig) information element; starting RRC connection establishment with an NR cell based on the first RRC connection reconfiguration message, where the NR cell is determined based on the NR secondary cell group configuration information element; starting a timer based on a quantity of RRC connection establishment failures of the NR cell, where the timer is set to a first duration; receiving a second RRC connection reconfiguration message within the first duration, where the second RRC connection reconfiguration message includes a measurement configuration information element, the measurement configuration information element carries a measurement object, and the measurement object includes the NR cell and another cell; and sending a measurement report (MeasurementReport) message within the first duration, where the measurement report message carries a measurement result of the other cell, but does not carry a measurement result of the NR cell.

It should be understood that a network device of an E-UTRA cell may deliver an RRC connection reconfiguration message to configure a terminal to add the NR cell to a secondary cell group. When receiving the RRC connection reconfiguration message that includes the NR secondary cell group configuration information element, it may be considered that the terminal camping on the E-UTRA cell is about to enter an EN-DC scenario. Reconfiguring a RRC connection includes: determining, based on the NR secondary cell group configuration information element, the NR cell that needs to be added to the secondary cell group, attempting to add the NR cell to the secondary cell group, and initiating random access to the NR cell. When the RRC connection establishment with the NR cell fails for a plurality of times (for example, a quantity of failures is greater than a preset threshold), it may be understood that the NR cell is not suitable for providing an EN-DC service for the terminal. Therefore, the timer may be started, where the timer is set to a first duration; and within the first duration, the reported measurement report message carries the measurement result of the other cell, but does not carry the measurement result of the NR cell.

Within the first duration, the terminal sends the measurement report message, where the measurement report message includes a measurement result (MeasResults) information element. The measurement result information element includes a measurement identifier (measId) field, where the measurement identifier field is not related to the NR cell. In other words, the measurement identifier field may carry a cell identifier of the other cell that is measured and reported by the terminal indicated by the measurement configuration (measConfig) information element and that is in the second RRC connection reconfiguration message, but does not carry a cell identifier of the NR cell. The cell identifier may be a physical cell identifier.

The quantity of RRC connection establishment failures of the NR cell includes one or more times of a quantity of random access failures of the NR cell, a quantity of times that a packet loss rate of packet data convergence protocol layer uplink data of the NR cell exceeds a second threshold, and the like.

When the foregoing method is used, the possibility that an E-UTRA network device asks the terminal to add an NR cell to the secondary cell group again may be reduced, thereby ensuring the service quality of terminal communication in an NSA networking architecture.

With reference to the technical solution provided in the first aspect, in a possible implementation, the timer is further set to a second duration. The wireless communication method further includes: sending a user equipment (UE) capability information message within the second duration, where the UE capability information message includes a UE E-UTRA capability (UE-EUTRA-Capability) information element, and the UE E-UTRA capability information element carries bandwidth combination capability information supported by the terminal except a bandwidth capability combination related to the NR cell.

It should be understood that the network device may obtain E-UTRA and MR-DC capability settings of the terminal by delivering a UE capability enquiry (UEcapacityEnquiry) message, where the UE capability enquiry message includes a frequency combination NR multi-radio dual connectivity MR-DC (requestedFreqBandsNR-MRDC) information element. The frequency combination NR MR-DC information element may carry an NR frequency band list and/or an E-UTRA frequency band list included in NR carrier aggregation and/or an MR-DC bandwidth combination supported by the terminal, and a capability setting corresponding to the MR-DC bandwidth combination. According to the 3GPP protocol specification (for example, 3GPP TS 36.331 V15.6.0), the terminal needs to report, in response to the UE capability enquiry message, a bandwidth capability combination corresponding to the NR frequency band list. The UE capability information message is reported. Therefore, the E-UTRA capability setting field in the UE capability information message carries the bandwidth combination capability information supported by the terminal except the bandwidth capability combination related to the NR cell, and the possibility that the network device indicates the terminal to add the NR cell to the secondary cell group may be reduced, thereby ensuring the service quality of the terminal communication in the NSA networking architecture. The E-UTRA capability setting (featureSetsEUTRA) field in the UE E-UTRA capability information element may be used to carry the bandwidth combination capability information supported by the terminal except the bandwidth capability combination related to the NR cell.

With reference to the technical solution provided in the first aspect or any possible implementation of the first aspect, in a possible implementation, the timer is further set to a third duration, and the wireless communication method further includes: sending the UE capability information message within the third duration, where the UE capability information message includes the UE E-UTRA capability information element, and the UE E-UTRA capability information element carries information that the terminal does not support an EN-DC.

The information that the terminal does not support the EN-DC may be carried by an EN-DC field included in the UE E-UTRA capability information element. The terminal may report whether the terminal supports an EN-DC capability, so that the network device may learn whether the terminal supports the EN-DC. When this method is used, the possibility that the network device indicates to the terminal to add the NR cell to the secondary cell group may be reduced, thereby ensuring the service quality of the terminal communication in the NSA networking architecture.

With reference to the technical solution provided in the first aspect or any possible implementation of the first aspect, in a possible implementation, the wireless communication method further includes: obtaining better service quality by using the NR cell, when a signal quality requirement is met. This is because an NR mode is better than an LTE mode. Therefore, before the timer is disabled, when a signal quality of the NR cell is greater than a first threshold, the timer may be disabled in advance and suppression of capability reporting related to the NR cell by the terminal may be stopped in advance. Stopping the suppression of the capability reporting related to the NR cell by the terminal in advance may enable the terminal to obtain better service quality. In an implementation, when the timer is disabled, all duration set in the timer may be deleted, or a timing function of the timer may be disabled.

Optionally, the timer is disabled within the first duration when the signal quality of the NR cell is greater than the preset first threshold. The second RRC connection reconfiguration message is received, and a measurement report message that carries the measurement result of the NR cell is sent after the timer is disabled.

Optionally, the timer is disabled within the second duration when the signal quality of the NR cell is greater than the preset first threshold. The UE capability information message that carries the bandwidth capability information supported by the terminal is sent after the timer is disabled.

Optionally, the timer is disabled within the third duration when the signal quality of the NR cell is greater than the preset first threshold. The user equipment capability information message that carries EN-DC capability information supported by the terminal is sent after the timer is disabled.

With reference to the technical solution provided in any one of the first aspect or the possible implementations of the first aspect, in a possible implementation, the starting a timer based on a quantity of RRC connection establishment failures of the NR cell includes: starting the timer when the quantity of RRC connection establishment failures of the NR cell exceeds a third threshold.

It should be understood that, in an implementation process, the first threshold, the second threshold, and the third threshold may be preset by a system (for example, set based on an empirical value), or may be determined according to a formula or a table. This is not limited herein.

According to a second aspect, embodiments of this application provide for a wireless communication method, including: receiving a first radio resource control RRC connection reconfiguration message, where the first RRC connection reconfiguration message includes a new radio (NR) secondary cell group configuration information element; starting RRC connection establishment with an NR cell based on the first RRC connection reconfiguration message, where the NR cell is determined based on the NR secondary cell group configuration information element; and starting a timer based on a quantity of RRC connection establishment failures of the NR cell.

Optionally, the timer is further set to a second duration. A user equipment (UE) capability information message is sent within the second duration, where the UE capability information message includes a UE E-UTRA capability information element, and the UE E-UTRA capability information element carries bandwidth combination capability information supported by the terminal except a bandwidth capability combination related to the NR cell.

With reference to the technical solution provided in the second aspect or any possible implementation of the second aspect, in a possible implementation, the wireless communication method further includes: disabling, within the second duration, the timer when a signal quality of the NR cell is greater than a preset first threshold; and sending the UE capability information message that carries the bandwidth capability information supported by the terminal after the timer is disabled.

With reference to the technical solution provided in the second aspect or any possible implementation of the second aspect, in a possible implementation, the wireless communication method further includes: disabling, within third duration, the timer when a signal quality of the NR cell is greater than a preset first threshold; and sending the user equipment capability information message that carries EN-DC capability information supported by the terminal after the timer is disabled.

With reference to the technical solution provided in any one of the first aspect and the second aspect, or any possible implementation of any one aspect, in a possible implementation, before the starting a timer based on a quantity of RRC connection establishment failures of the NR cell, the following optional method may be used to terminate the RRC connection to the NR cell, so as to obtain better service quality.

Optionally, a secondary cell group failure (SCG Failure) message is sent.

Optionally, the RRC connection to the NR cell is released.

Optionally, an RRC connection reestablishment message is sent, to request RRC connection reestablishment.

According to a third aspect, embodiments of this application provides a wireless communication apparatus, including a receiving unit, a processing unit (e.g., one or more processors, or one or more processing circuits), and a sending unit. The receiving unit and the sending unit may be part of a transceiver of the wireless communication apparatus.

The receiving unit is configured to receive a first radio resource control RRC connection reconfiguration message, where the first RRC connection reconfiguration message includes a new radio (NR) secondary cell group configuration information element. The processing unit is configured to start RRC connection establishment with an NR cell based on the first RRC connection reconfiguration message, where the NR cell is determined based on the NR secondary cell group configuration information element. The processing unit is further configured to start a timer based on a quantity of RRC connection establishment failures of the NR cell, where the timer is set to a first duration. The receiving unit is further configured to receive a second RRC connection reconfiguration message within the first duration, where the second RRC connection reconfiguration message includes a measurement configuration information element, the measurement configuration information element carries a measurement object, and the measurement object includes the NR cell and another cell. The sending unit is configured to send a measurement report message within the first duration, where the measurement report message carries a measurement result of the other cell, but does not carry a measurement result of the NR cell.

The quantity of RRC connection establishment failures of the NR cell includes one or more times of a quantity of random access failures of the NR cell, a quantity of times that a packet loss rate of packet data convergence protocol layer uplink data of the NR cell exceeds a second threshold, and the like.

With reference to the technical solution provided in the third aspect or any possible implementation of the third aspect, in a possible implementation, the timer is further set to a second duration. The sending unit is further configured to send a user equipment capability information message within the second duration. The user equipment capability information message includes a user equipment E-UTRA capability information element, the user equipment E-UTRA capability information element includes an E-UTRA capability setting field, and the E-UTRA capability setting field carries bandwidth combination capability information supported by the terminal except a bandwidth combination capability related to the NR cell.

With reference to the technical solution provided in the third aspect or any possible implementation of the third aspect, in a possible implementation, the timer is further set to a third duration. The user equipment capability information message is sent within the third duration, where the user equipment capability information message includes the user equipment E-UTRA capability information element, and the user equipment E-UTRA capability information element carries information that the terminal does not support E-UTRA and a new radio dual connectivity EN-DC.

With reference to the technical solution provided in the third aspect or any possible implementation of the third aspect, in a possible implementation, the processing unit is further configured to disable, within the first duration, the timer when a signal quality of the NR cell is greater than a preset first threshold. The receiving unit is further configured to receive the second RRC connection reconfiguration message after the timer is disabled. The sending unit is further configured to send a measurement report message that carries the measurement result of the NR cell after the timer is disabled and the second RRC connection reconfiguration message is received.

With reference to the technical solution provided in the third aspect or any possible implementation of the third aspect, in a possible implementation, the processing unit is further configured to disable, within the second duration, the timer when a signal quality of the NR cell is greater than a preset first threshold. The sending unit is further configured to send the UE capability information message that carries the bandwidth capability information supported by the terminal after the timer is disabled.

With reference to the technical solution provided in the third aspect or any possible implementation of the third aspect, in a possible implementation, the sending unit is further configured to send the user equipment capability information message that carries EN-DC capability information of the terminal after the timer is disabled.

With reference to the technical solution provided in any one of the third aspect or any possible implementations of the third aspect, in a possible implementation, the sending unit is further configured to: before the timer is started based on the quantity of RRC connection establishment failures of the NR cell, send a secondary cell group failure message.

With reference to the technical solution provided in the third aspect or any possible implementation of the third aspect, in a possible implementation, the sending unit is further configured to: before the timer is started based on the quantity of RRC connection establishment failures of the NR cell, release an RRC connection to the NR cell.

With reference to the technical solution provided in the third aspect or any possible implementation of the third aspect, in a possible implementation, the sending unit is further configured to: before the timer is started based on the quantity of RRC connection establishment failures of the NR cell, send an RRC connection reestablishment request message, where the RRC connection reestablishment request message is used to request RRC connection reestablishment.

According to a fourth aspect, embodiments of this application provide for a computer-readable storage medium, where the computer-readable storage medium stores program code. When the program code is executed by a terminal or a processor in a terminal, the method according to any one of the first aspect and the second aspect or the possible implementations of any one of the first aspect and the second aspect is implemented.

According to a fifth aspect, embodiments of this application provides a computer program product. When program code included in the computer program product is executed by a processor in a terminal, the method according to any one of the first aspect and the second aspect or the possible implementations of any one of the first aspect and the second aspect is implemented.

According to a sixth aspect, embodiments of this application provides a communication system, including a wireless network device, and the wireless communication apparatus according to any one of the third aspect or the possible implementations of the third aspect.

The wireless network device may be a wireless network device of an E-UTRA cell.

It should be understood that for technical solution details and technical effects in any one of the second aspect to the sixth aspect or the possible implementations of the second aspect to the sixth aspect, refer to the technical solution details and technical effects in any one of the first aspect or the possible implementations of the first aspect. Details are not described again.

It should be understood that, in the foregoing schematic diagrams of structures, sizes and forms of the block diagrams are used only for reference, and should not constitute an exclusive interpretation of embodiments of this application. Relative locations and inclusion relationships between the block diagrams shown in the schematic diagrams of structures are merely used to schematically represent structural associations between the block diagrams, rather than limiting a physical connection manner in the embodiments of this application.

DESCRIPTION OF EMBODIMENTS

The following further describes technical solutions provided in this application with reference to accompanying drawings and embodiments. It should be understood that system architectures and service scenarios in the embodiments of this application are mainly intended to describe possible implementations of the technical solutions of this application, and should not be construed as a unique limitation on the technical solutions of this application. A person of ordinary skill in the art may know that, with evolution of system architectures and emergence of new service scenarios, the technical solutions provided this application are also applied to similar technical problems.

It should be understood that the embodiments of this application provide a wireless communication method, apparatus, and system, to ensure service quality of terminal communication in NSA networking.

Because problem-resolving principles of the technical solutions are the same or similar, in the following descriptions of embodiments, some repeated parts may not be described herein, but it should be considered that the embodiments are mutually referenced and may be combined with each other.

Figure 1:
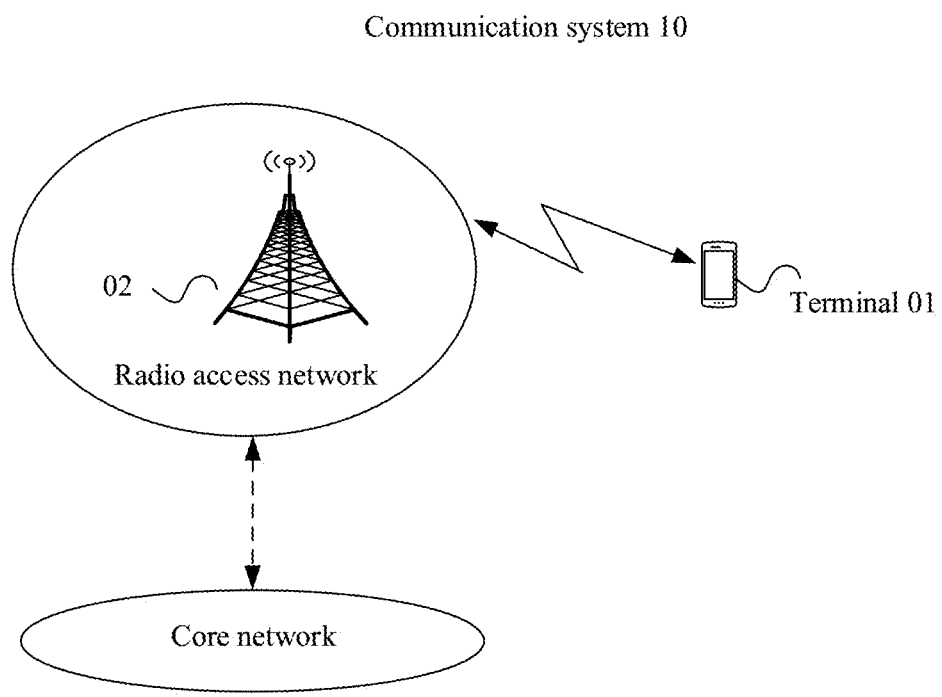
FIG. 1 is a schematic diagram of a structure of a communication system according to an embodiment of this application.

FIG. 1 is a schematic diagram of a structure of a communication system according to an embodiment of this application. As shown in FIG. 1, in a communication system 10, one or more terminals 01 communicate with a radio access network (RAN). The RAN includes one or more wireless network devices 02. It should be understood that, for clarity, FIG. 1 shows only one network device and one terminal. Optionally, the communication system may further include a core network that can communicate with the RAN. The core network herein may be an evolved packet gateway (EPC) of a 4G communication system or a next generation core (NGC) of a 5G communication system. Further, optionally, the communication system may further include one or more external networks connected to the core network, for example, the Internet, and a public switched telephone network.

It should be understood that the communication system may be used as an example of a mobile communication system based on the 3GPP technical specification, or may include a wireless communication system based on another wireless communication standard, for example, the 802 standards of the Institute of Electrical and Electronics Engineers (IEEE), such as 802.11, 802.15, and 802.20.

The terminal 01 may also be referred to as user equipment (UE), a mobile station (MS), or a subscriber unit (SU). In descriptions of embodiments of this application, the terminal and the UE are not distinguished. The terminal may be but is not limited to a mobile phone, a tablet computer, a laptop computer, a wearable device (for example, a smartwatch, a smart band, a smart helmet, or smart glasses), or another communication device having a wireless access capability, such as various Internet of things devices including a smart home device (for example, a smart meter or a smart appliance), a smart vehicle, or the like. The wireless network device 02 is a computing device having a wireless communication function. It should be understood that the wireless network device 02 may be a radio access network device, for example, a base station. The base station may be an evolved NodeB (eNB, or eNodeB) in the 4G communication system, or a next generation NodeB (gNodeB, or gNB) in the 5G communication system, or a base station in another possible radio access technology. There may also be a plurality of physical forms and transmit powers of the base station, for example, a macro base station or a micro base station.

Figure 2:
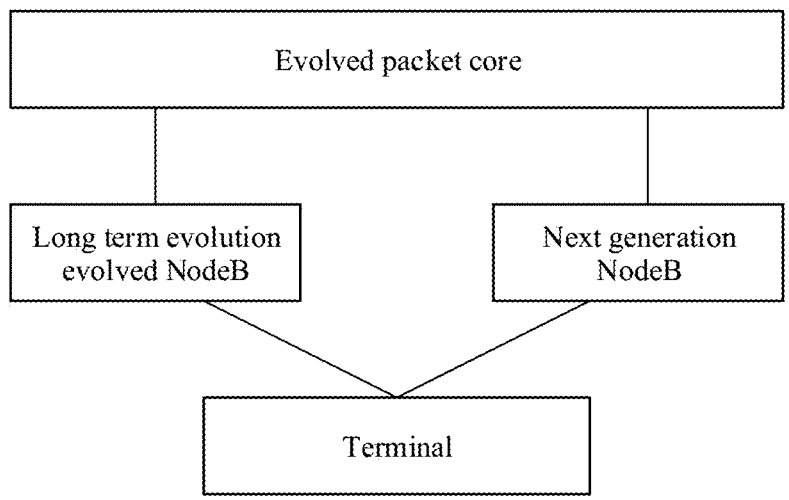
FIG. 2 is a schematic diagram of a structure of a non-standalone networking according to an embodiment of this application.

FIG. 2 is a schematic diagram of a structure of non-standalone networking according to an embodiment of this application. As shown in FIG. 2, in the NSA networking architecture, both a long term evolution (LTE) evolved NodeB (LTE eNB) and a next generation NodeB (gNB) are connected to an evolved packet core (EPC) of a 4G communication system. Herein, the LTE eNB serves as a master node and is connected to the EPC on a control plane, and the gNB serves as a secondary node. In other words, control plane signaling is anchored on the LTE eNB, and a user plane may be independently served by the LTE eNB or the gNB, or may be served by both the LTE eNB and the gNB. Serving cells associated with the master node are referred to as a master cell group (MCG), and serving cells associated with the secondary node are referred to as a secondary cell group (SCG). Generally, a network configures the MCG and zero or one SCG for a terminal.

The foregoing NSA networking architecture supports an EN-DC feature. After the terminal accesses an LTE network, how to trigger EN-DC establishment is determined by the LTE eNB serving as the master node. Generally, there are two main EN-DC establishment trigger mechanisms: blind establishment and non-blind establishment.

(1) Blind Establishment

Figure 3:
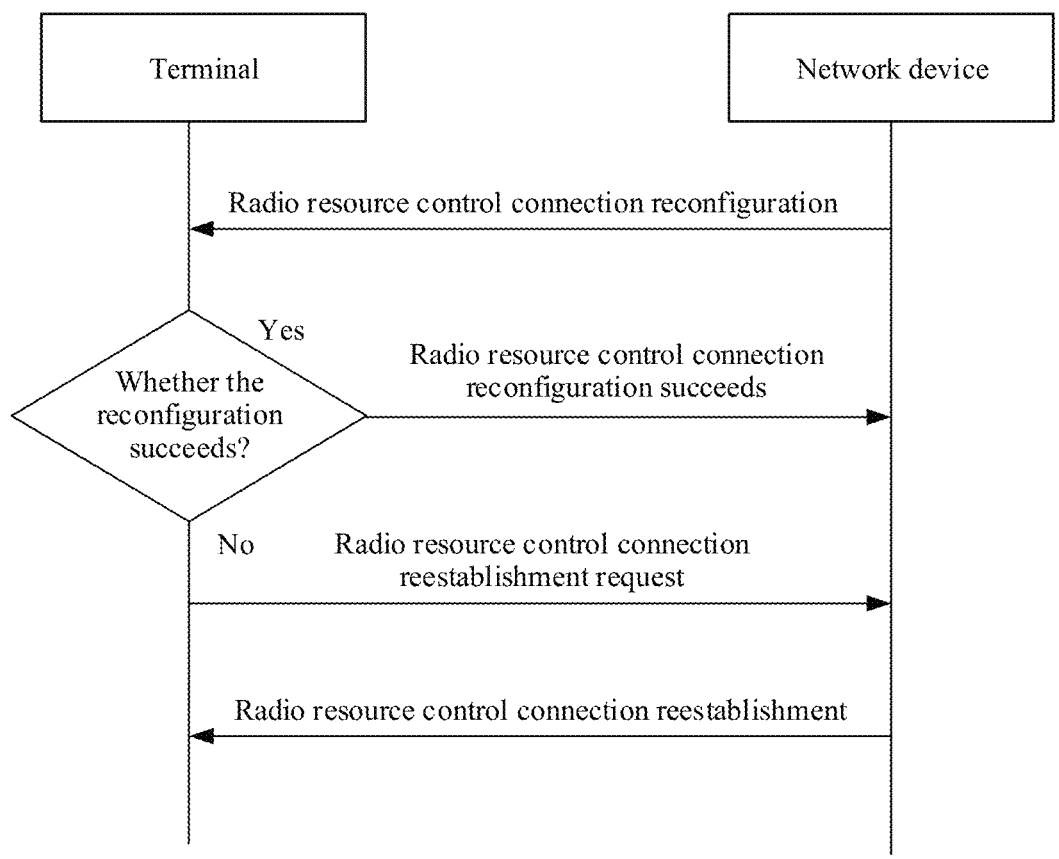
FIG. 3 is an example flowchart of EN-DC blind establishment according to an embodiment of this application.

After the terminal accesses the LTE network, the LTE eNB determines whether to configure an EN-DC for the terminal based on factors such as a UE capability reported by the terminal (for example, whether the terminal supports the EN-DC feature), and whether a gNB supporting the EN-DC feature exists in a neighboring cell list. FIG. 3 is a schematic flowchart of EN-DC blind establishment according to an embodiment of this application. Refer to FIG. 3. A network device (for example, the LTE eNB) delivers a radio resource control (RRC) connection reconfiguration (RRCConnectionReconfiguration) message to the terminal, where the RRC connection reconfiguration message includes a NR secondary cell group configuration (nr-SecondaryCellGroupConfig) information element. The RRC connection reconfiguration message is used to modify an RRC connection. After receiving the foregoing message, the terminal triggers an RRC reconfiguration procedure. When RRC connection reconfiguration succeeds, the terminal reports a radio resource control connection reconfiguration complete (RRCConnectionReconfigurationComplete) message, where the RRC connection reconfiguration complete message is used to confirm that the RRC connection reconfiguration is complete.

Alternatively, when the reconfiguration of the terminal fails, the terminal sends a radio resource control connection reestablishment request (RRCConnectionReestablishmentRequest) message to the network device, where the RRC connection reestablishment request message is used to request RRC connection reestablishment. The network device delivers a radio resource control connection reestablishment (RRCConnectionReestablishment) message based on the RRC connection reestablishment request message, to reestablish the RRC connection.

(2) Non-Blind Establishment

Figure 4:
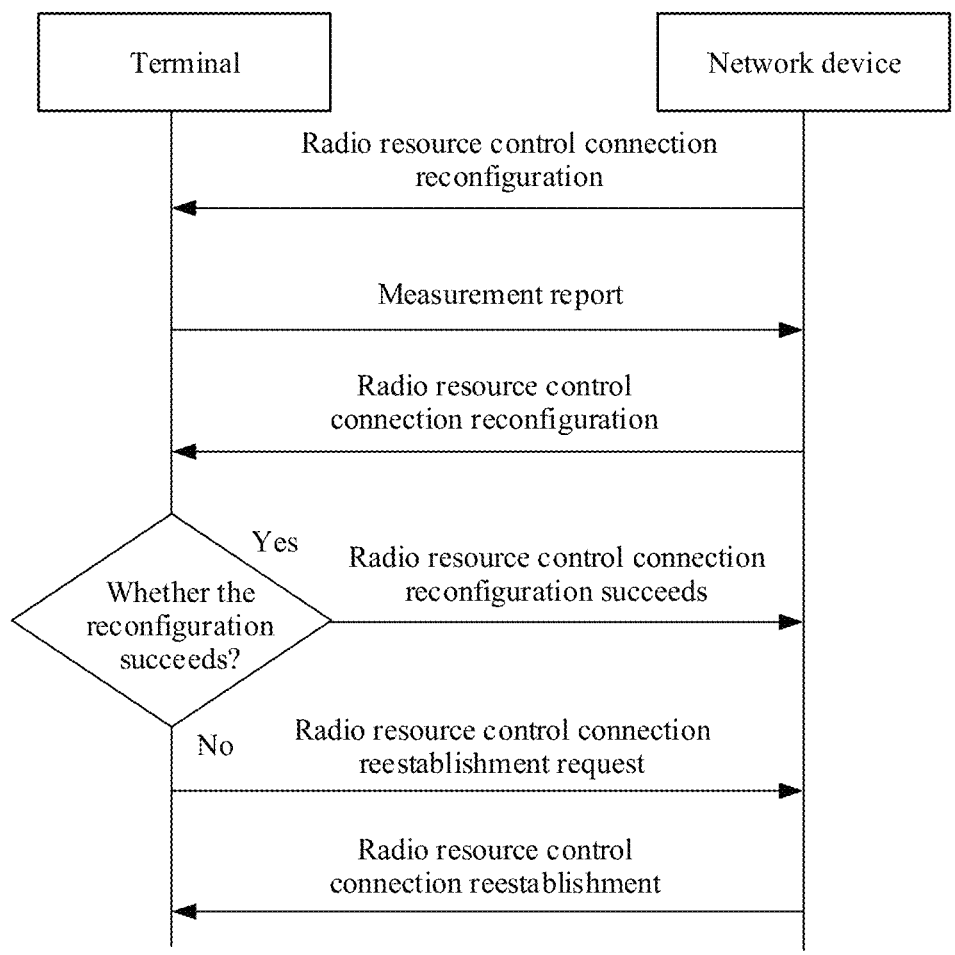
FIG. 4 is an example flowchart of EN-DC non-blind establishment according to an embodiment of this application.

Different from a blind establishment process, after the terminal accesses the LTE network, when a condition for blind addition to a secondary cell is met, the LTE eNB configures a measurement event for the terminal to trigger measurement of a 5G neighboring cell performed by the terminal, and the LTE eNB adds a 5G neighboring cell that meets the condition to the SCG based on a measurement result reported by the terminal. This non-blind establishment manner can provide a more stable and reliable dual connection service for the terminal. FIG. 4 is a schematic flowchart of EN-DC non-blind establishment according to an embodiment of this application. The network device delivers the radio resource control connection reconfiguration message to the terminal, where the RRC connection reconfiguration message includes a measurement configuration (measConfig) information element. The terminal determines a measurement object based on the measurement configuration in the RRC connection reconfiguration message, and reports a measurement report. The network device may determine, based on the measurement report reported by the terminal, the 5G neighboring cell that meets the condition, and indicate, based on the radio resource control connection reconfiguration message, the terminal to add the 5G neighboring cell that meets the condition to the SCG. After receiving the foregoing message, the terminal triggers the reconfiguration procedure. Similarly, when the reconfiguration succeeds, the terminal reports the radio resource control connection reconfiguration complete message, where the RRC connection reconfiguration complete message is used to confirm that the RRC connection reconfiguration is complete. Alternatively, when the reconfiguration of the terminal fails, the terminal sends the radio resource control connection reestablishment request message to the network device, where the RRC connection reestablishment request message is used to request the RRC connection reestablishment. The network device may deliver the radio resource control connection reestablishment message based on the RRC connection reestablishment request message, to reestablish the RRC connection.

Alternatively, the LTE eNB may further store, based on the measurement result reported by the terminal, the 5G neighboring cell that meets the condition, and then determine, based on traffic or a to-be-scheduled data volume of the terminal, whether to add the 5G neighboring cell to the SCG. When a to-be-scheduled data volume of the terminal exceeds a threshold, the LTE eNB selects a best 5G neighboring cell for the terminal to initiate an SCG addition procedure. In this traffic-based EN-DC establishment manner, the EN-DC is established only for a required terminal. In other words, SCG addition is performed for the required terminal.

It should be understood that, in an EN-DC scenario, a compatibility issue (for example, a UE capability mismatch) may occur, consequently, the RRC reconfiguration of the terminal fails. Refer to FIG. 3 and FIG. 4. After an RRC connection reestablishment procedure is triggered, if the RRC reconfiguration fails, subsequently the network still periodically delivers a reconfiguration message of adding to the SCG. As a result, the terminal repeatedly enters the reestablishment procedure, and user experience cannot be effectively improved.

In addition, after the EN-DC is established, packet data convergence protocol (PDCP) layer uplink data of a 5G cell is limited (for example, the uplink data has a high packet loss rate). If user data is not transmitted in time, a user may encounter the following scenarios: data service response is slow, a link may even fail, and/or the data service is abnormally interrupted.

A radio link failure (RLF) identification procedure is as follows: When a lower layer of the terminal continuously reports N310 out-of-synchronization (early-out-of-sync) indications to an RRC layer, a timer T310 is started. If the timer is not restored to normal during running of the timer, an RLF is determined to occur, an SCG failure information (SCGFailureInformation) message is reported to the network device, and the network device waits to deliver an indication message, so as to maintain, change, or release the SCG. In the foregoing radio link failure identification procedure, the N310 out-of-synchronization indications need to be continuously reported to trigger starting of the timer T310, and SCG RLF is triggered only after the timer exceeds and is not restored to normal. Therefore, an identification time period is long. In addition, if an uplink limited state of the 5G cell does not meet an RLF identification condition, the SCG failure information message is not reported, and user experience cannot be improved and remains poor. Alternatively, the network still does not process the SCG failure information message even if the terminal reports the SCG failure information message, the terminal maintains in a connected state in a 5G cell with an uplink limited state for a long time period. This needlessly increases the power consumption of the terminal.

Therefore, it is necessary to provide a solution for ensuring terminal communication quality in the NSA networking architecture.

Figure 5:
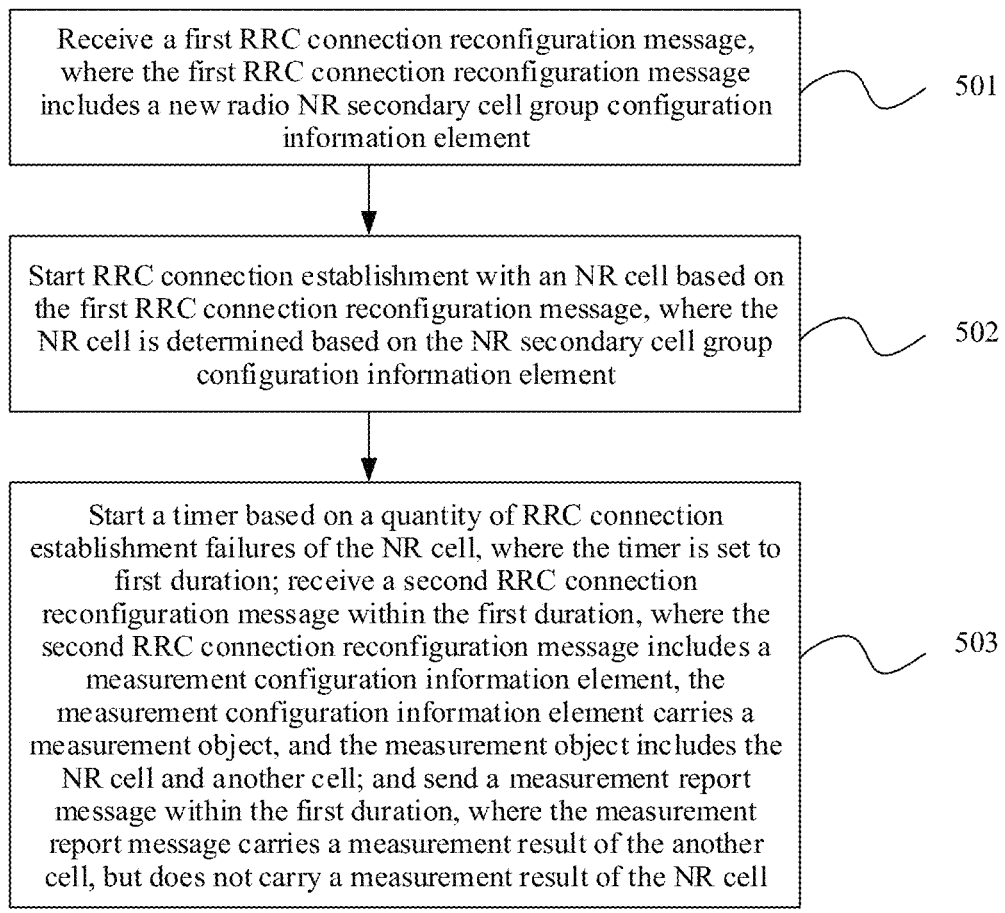
FIG. 5 is an example flowchart of a wireless communication method according to an embodiment of this application.

FIG. 5 provides a wireless communication method according to an embodiment of this application. The wireless communication method may be performed by a terminal device, or may be performed by a chip inside a terminal. As shown in FIG. 5, the wireless communication method includes the following steps.

501: Receive a first RRC connection reconfiguration message, where the first RRC connection reconfiguration message includes a new radio (NR) secondary cell group configuration information element.

502: Start RRC connection establishment with an NR cell based on the first RRC connection reconfiguration message, where the NR cell is determined based on the NR secondary cell group configuration information element.

It should be understood that, for a terminal that is in an LTE mode and that accesses an EPC by using a network device of an E-UTRA cell, when the received first RRC connection reconfiguration message includes the NR secondary cell group configuration information element, the terminal may consider that it is about to enter an E-UTRA and NR dual connectivity scenario, namely, an EN-DC scenario. The terminal, in response to the first RRC connection reconfiguration message, starts RRC connection reconfiguration, including starting the RRC connection establishment with the NR cell. The terminal may add a specified NR cell to an SCG based on information carried in the NR secondary cell group configuration information element, and may attempt to initiate a random access procedure for the NR cell. The NR cell may determine the specified NR cell based on a special cell configuration (spCellConfig) field in the NR secondary cell group configuration information element. If the special cell field further includes synchronization reconfiguration (reconfigurationWithSync) information, the random access procedure for the NR cell is initiated.

When the RRC connection reconfiguration of the terminal succeeds, the terminal reports an RRC connection reconfiguration complete message, where the RRC connection reconfiguration complete message is used to confirm that the RRC connection reconfiguration is complete. Otherwise, when the RRC connection reconfiguration of the terminal fails, the terminal sends an RRC connection reestablishment request message, to request RRC connection reestablishment. In this case, the network device may deliver an RRC connection reestablishment message based on the RRC connection reestablishment request message, to reestablish an RRC connection.

It should be understood that in the following, that the RRC connection reconfiguration fails in this application may be understood as that the RRC connection establishment failure of the NR cell. Details are not described herein again.

There are a plurality of possible reasons why the RRC connection reconfiguration fails. The following provides several examples for understanding:

(1) A UE Capability Mismatch

The UE capability supported by the terminal may not match a parameter of the NR cell added to the SCG that is indicated by the network device. For example, the terminal may not support a frequency of the NR cell added to the SCG that is indicated by the network device; or the terminal may not support a bandwidth of the NR cell added to the SCG that is indicated by the network device. In this case, the terminal cannot successfully add the NR cell to the SCG, consequently, the RRC connection reconfiguration fails.

(2) Poor Signal Quality of the NR Cell

When the signal quality of the NR cell added to the SCG that is indicated by the network device is poor, it may be difficult for the terminal to establish and maintain an effective and reliable RRC connection to the network device corresponding to the NR cell. For example, a packet loss rate of PDCP layer uplink data in the NR cell is high, consequently, the RRC connection reconfiguration fails.

(3) A Random Access Failure

In the random access procedure initiated by the terminal for the NR cell added to the SCG that is indicated by the network device, SCG addition may fail and the PDCP layer uplink data may be limited (for example, the uplink data has a high packet loss rate) due to a network compatibility problem. If user data is not transmitted in time, a user may encounter the following cases: data service is slowly responded, even a link fails, and the data service is abnormally interrupted.

However, because a network side may not be able to learn the reason why the RRC connection reconfiguration fails, the network side may repeatedly indicate to the terminal to add same NR cells to the SCG, and then the RRC connection reconfiguration fails for a plurality of times. In this process, user experience may be affected. Therefore, the following optional method may be used to terminate a process in which the network device repeatedly indicates the terminal to reconfigure the RRC connection, and the terminal repeatedly fails to reconfigure the RRC connection in advance.

Optionally, an SCG failure information message is sent.

The terminal reports an SCG failure in advance by sending the SCG failure information message to the network device, thereby reducing a quantity of RRC connection reestablishment failures of the terminal. The network device may indicate to the terminal to maintain, change, or release the SCG. Generally, the network device indicates to change or release the SCG. Therefore, the terminal may terminate, based on an indication of the network device, the process in which the terminal repeatedly fails to reconfigure the RRC connection in advance.

Optionally, the RRC connection to the NR cell is released.

The terminal may actively release the RRC connection to the NR cell to terminate the process in which the terminal repeatedly fails to reconfigure the RRC connection in advance.

Optionally, the RRC connection reestablishment request message is sent.

The terminal may send the RRC connection reestablishment request message, to request the network device to indicate to reestablish the RRC connection.

Optionally, the wireless communication method further includes:

503: Start a timer based on the quantity of RRC connection establishment failures of the NR cell, where the timer is set to a first duration; receive a second RRC connection reconfiguration message within the first duration, where the second RRC connection reconfiguration message includes a measurement configuration information element, the measurement configuration information element carries a measurement object, and the measurement object includes the NR cell and another cell; and send a measurement report message within the first duration, where the measurement report message carries a measurement result of the other cell, but does not carry a measurement result of the NR cell.

If the RRC connection reconfiguration fails for the plurality of times, it may be understood that the NR cell is not suitable to be added to the SCG. According to the 3GPP technical specification, if measurement configuration delivered by the network device and received by the terminal includes the NR cell, the terminal needs to also report a measurement report of the NR cell when reporting a measurement report. Herein, within the first duration, reporting the measurement report of the NR cell is suppressed, to reduce a possibility that the network device indicates the terminal to add the NR cell to the SCG.

For example, the network device may specify, based on a measurement object NR (MeasObjectNR) information element, a NR cell that needs to be measured, and indicate, based on a report configuration (reportConfig) information element, a measurement event of a reporting standard related to the NR cell, for example, an event B1-NR and/or an event B2-NR. In measurement results obtained by the terminal, if a corresponding measurement result meets the reporting standard, the measurement report of the corresponding NR cell is reported. The network device may indicate, by delivering the measurement configuration information element in the RRC connection reconfiguration message, a cell identifier that needs to be measured and reported by the terminal. Correspondingly, the terminal sends the measurement report (MeasurementReport) message, where the measurement report message includes a measurement result (MeasResults) information element. The measurement result information element includes a measurement identifier (measId) field, where the measurement identifier field is used to indicate a cell identifier related to the measurement result reported by the terminal. It may be understood that the measurement identifier field needs to include a cell identifier of a measurement report indicated by the network device by using the measurement configuration information element. However, in this method, within the first duration, the measurement result of the corresponding NR cell is not reported even if the corresponding measurement result meets the reporting standard. In other words, even if the network device indicates, based on the measurement configuration information element, to measure and report the NR cell, within the first duration, the measurement identifier field in the measurement report message reported by the terminal still does not include a physical cell identifier of the NR cell.

Further, when the terminal reports a UE capability information message, reporting a bandwidth combination (BC) in a multi-radio dual connectivity (MR-DC) capability of the terminal or reporting an EN-DC capability of the terminal may be suppressed.

Optionally, the timer is further set to a second duration, and the wireless communication method further includes 504: Send the user equipment capability information message within the second duration, where the user equipment capability information message includes a user equipment E-UTRA capability information element, the user equipment E-UTRA capability information element includes an E-UTRA capability setting field, and the E-UTRA capability setting field carries bandwidth combination capability information supported by the terminal except a bandwidth combination capability related to the NR cell.

It should be understood that the network device may obtain E-UTRA and MR-DC capability settings of the terminal by delivering a UE capability enquiry (UEcapacityEnquiry) message, where the UE capability enquiry message includes a frequency combination NR multi-radio dual connectivity MR-DC (requestedFreqBandsNR-MRDC) information element. The frequency combination NR MR-DC information element may carry an NR frequency band list and/or E-UTRA frequency band list included in NR carrier aggregation and/or an MR-DC bandwidth combination supported by the terminal, and a capability setting corresponding to the MR-DC bandwidth combination. According to the 3GPP protocol specification (for example, 3GPP TS 36.331 V15.6.0), the terminal reports, in response to the UE capability enquiry message, a bandwidth capability combination corresponding to the NR frequency band list to respond. The UE capability information message is reported. Therefore, the E-UTRA capability setting field in the UE capability information message carries the bandwidth combination capability information supported by the terminal except the bandwidth capability combination related to the NR cell, and a possibility that the network device indicates the terminal to add the NR cell to a secondary cell group may be reduced, thereby ensuring service quality of terminal communication in NSA networking. The E-UTRA capability setting (featureSetsEUTRA) field in the UE E-UTRA capability information element may be used to carry the bandwidth combination capability information supported by the terminal except the bandwidth capability combination related to the NR cell.

Optionally, the timer is further set to a third duration, and the wireless communication method further includes 505: Send the user equipment capability information message within the third duration, where the user equipment capability information message includes the user equipment E-UTRA capability information element, and the user equipment E-UTRA capability information element carries information that the terminal does not support E-UTRA and a new radio dual connectivity EN-DC.

The information that the terminal does not support the EN-DC may be carried by an EN-DC field included in the UE E-UTRA capability information element. The terminal may report whether the terminal supports an EN-DC capability, so that the network device may learn whether the terminal supports the EN-DC. When this method is used, the possibility that the network device indicates to the terminal to add the NR cell to the secondary cell group may be reduced, thereby ensuring the service quality of the terminal communication in the NSA networking.

It may be understood that the first duration, the second duration, and the third duration may be the same or different, and may be preset by a system. The timer may be implemented by software, for example, a piece of code or a program having a timer function. Alternatively, the timer may be implemented by hardware, for example, a terminal baseband processor or a hardware timer in a system chip. Alternatively, the timer may be implemented by a combination of software and hardware. For example, a hardware timer in a terminal baseband processor or a system chip is used in combination with a piece of code or a program that has a counting function. When the hardware timer reaches a preset time point, counting is performed once. When a product of a quantity of times of counting and duration of the hardware timer reaches the first duration, the second duration, or the third duration, the foregoing suppression behavior is terminated, and reporting of the UE capability is restored to normal.

The reason why the RRC connection reconfiguration fails for the plurality of times is described as above, and there are a plurality of possibilities. During implementation, the reason why the RRC connection reconfiguration fails may be identified, and corresponding information is recorded. One or more of pieces of related information such as an abnormality reason, an abnormality time period, abnormal E-UTRA cell information, abnormal NR cell information, and a quantity of RRC connection reconfiguration failures due to a same abnormality reason may be recorded. Cell information may include one or more parameters such as a frequency, a bandwidth, a tracking area identifier, a physical cell identifier, a global cell identifier, and cell signal quality of the cell.

In addition, when the duration set in the foregoing timer exceeds, reporting the measurement report of the NR cell and the UE capability information may be restored to normal.

If the duration set in the timer is not exceeded, and it is measured in advance that the signal quality of the NR cell is relatively good and exceeds a first threshold, reporting the measurement report of the NR cell and the UE capability information may be restored to normal in advance. The first threshold may be preset by the system, for example, the first threshold is greater than or equal to a threshold for reporting the measurement report of the NR cell required in the reporting standard. Optionally, the signal quality of the NR cell in this application is determined by one or more parameters such as a reference signal received power, a received signal strength indicator, reference signal receiving quality, and a signal to interference plus noise ratio.

Optionally, the timer is disabled within the first duration when the signal quality of the NR cell is greater than the preset first threshold. The second RRC connection reconfiguration message is received, and a measurement report message that carries the measurement result of the NR cell is sent after the timer is disabled.

Optionally, the timer is disabled within the second duration when the signal quality of the NR cell is greater than the preset first threshold. The UE capability information message that carries the bandwidth capability information supported by the terminal is sent after the timer is disabled.

Optionally, the timer is disabled within the third duration when the signal quality of the NR cell is greater than the preset first threshold. The user equipment capability information message that carries EN-DC capability information supported by the terminal is sent after the timer is disabled.

Figure 6:
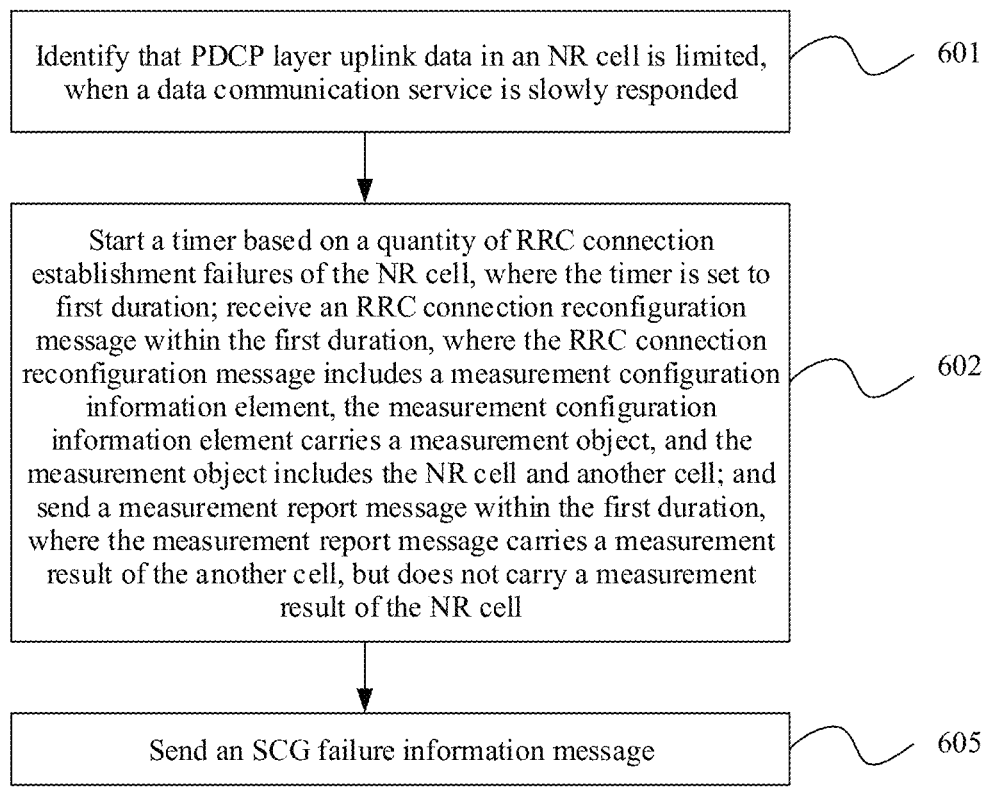
FIG. 6 is an example flowchart of a wireless communication method according to an embodiment of this application.

FIG. 6 provides a wireless communication method according to an embodiment of this application. The corresponding wireless communication method may be performed by a terminal device, or may be performed by a chip inside a terminal. As shown in FIG. 6, the wireless communication method includes the following steps.

601: Identify that PDCP layer uplink data in an NR cell is limited, when a data communication service is slowly responded.

When the data communication service (for example, Internet access, video, or a game) is slowly responded, that the PDCP layer uplink data in the NR cell is limited is identified. For example, a packet loss rate of the PDCP layer uplink data is greater than a second threshold, or even, the uplink data buffered on the PDCP layer overflows.

In this case, it may be understood that the NR cell is not suitable for the service. Within a specified duration, suppression on the NR cell may start, and a connection to the NR cell may be terminated.

Similarly, during implementation, a reason why the PDCP layer uplink data in the NR cell is limited may be identified, and corresponding information is recorded. One or more of pieces of related information such as an abnormality reason, an abnormality time period, abnormal E-UTRA cell information, abnormal NR cell information, and a quantity of times that the PDCP layer uplink data in the NR cell is limited due to a same abnormality reason may be recorded. Cell information may include one or more parameters such as a frequency, a bandwidth, a tracking area identifier, a physical cell identifier, a global cell identifier, and cell signal quality of the cell.

Optionally, the wireless communication method further includes 602: Start a timer based on a quantity of RRC connection establishment failures of the NR cell, where the timer is set to a first duration; receive an RRC connection reconfiguration message within the first duration, where the RRC connection reconfiguration message includes a measurement configuration information element, the measurement configuration information element carries a measurement object, and the measurement object includes the NR cell and another cell; and send a measurement report message within the first duration, where the measurement report message carries a measurement result of the other cell, but does not carry a measurement result of the NR cell.

Optionally, the wireless communication method further includes 603: Start the timer based on the quantity of RRC connection establishment failures of the NR cell, where the timer is further set to a second duration; and send a user equipment capability information message within the second duration, where the user equipment capability information message includes a user equipment E-UTRA capability information element, the user equipment E-UTRA capability information element includes an E-UTRA capability setting field, and the E-UTRA capability setting field carries bandwidth combination capability information supported by the terminal except a bandwidth combination capability related to the NR cell.

Optionally, the wireless communication method further includes 604: Start the timer based on the quantity of RRC connection establishment failures of the NR cell, where the timer is further set to a third duration; and send the user equipment capability information message within the third duration, where the user equipment capability information message includes the user equipment E-UTRA capability information element, and the user equipment E-UTRA capability information element carries information that the terminal does not support E-UTRA and a new radio dual connectivity EN-DC.

For related details of 602 to 604, refer to related descriptions of 503 to 505 in FIG. 5. Details are not described herein again.

605: Send an SCG failure information message.

The terminal may send the SCG failure information message to report an SCG failure in advance. Similarly, a network device may indicate to the terminal to maintain, change, or release an SCG. Generally, the network device indicates to change or release the SCG. Therefore, the terminal may terminate, based on an indication of the network device, the connection to the NR cell in advance.

Optionally, the wireless communication method further includes:

606: Send an RRC connection reestablishment request message when receiving the RRC connection reconfiguration message, where the RRC connection reconfiguration message includes an NR secondary cell group configuration information element, and the NR secondary cell group configuration information element indicates to add the NR cell to the SCG.

If the network device still starts a blind configuration and indicates, based on the RRC connection reconfiguration message, the terminal to add the NR cell to the SCG, the network device may send the RRC connection reestablishment request message to avoid establishing the connection to the NR cell.

Figure 7:
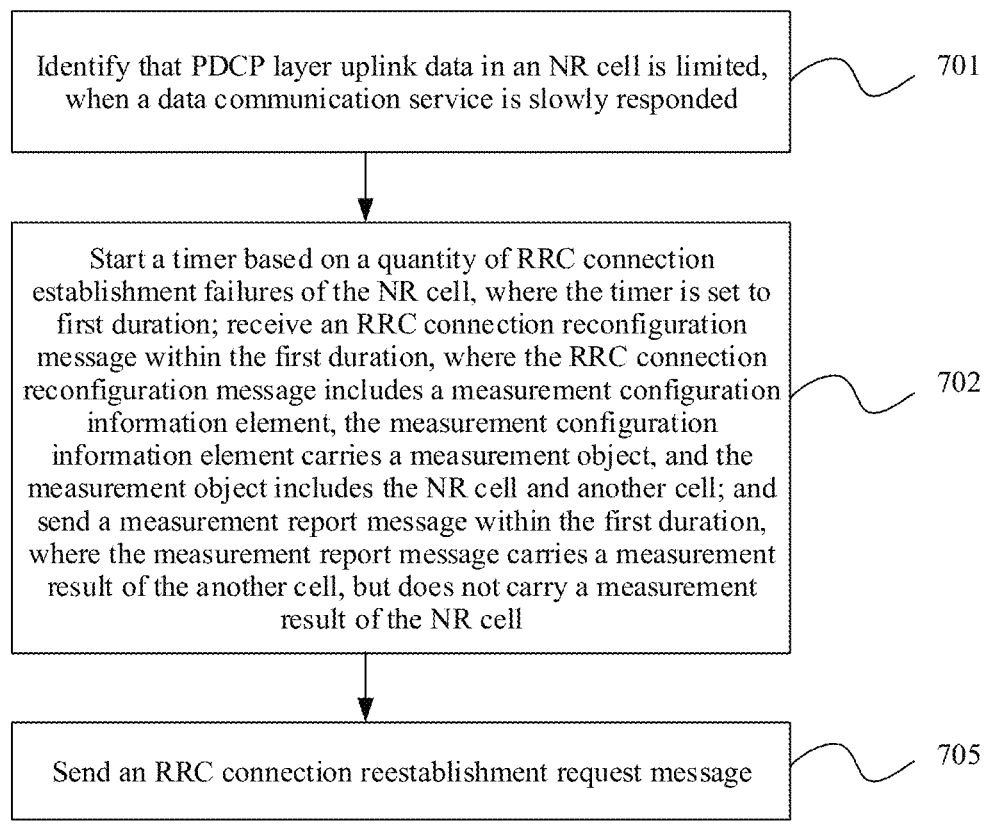
FIG. 7 is an example flowchart of a wireless communication method according to an embodiment of this application.

FIG. 7 provides a wireless communication method according to an embodiment of this application. The corresponding wireless communication method may be performed by a terminal device, or may be performed by a chip inside a terminal. As shown in FIG. 7, the wireless communication method includes the following steps.

701: Identify that PDCP layer uplink data in an NR cell is limited, when a data communication service is slowly responded.

Optionally, the wireless communication method further includes 702: Start a timer based on a quantity of RRC connection establishment failures of the NR cell, where the timer is set to a first duration; receive an RRC connection reconfiguration message within the first duration, where the RRC connection reconfiguration message includes a measurement configuration information element, the measurement configuration information element carries a measurement object, and the measurement object includes the NR cell and another cell; and send a measurement report message within the first duration, where the measurement report message carries a measurement result of the other cell, but does not carry a measurement result of the NR cell.

Optionally, the wireless communication method further includes 703: Start the timer based on the quantity of RRC connection establishment failures of the NR cell, where the timer is further set to a second duration; and send a user equipment capability information message within the second duration, where the user equipment capability information message includes a user equipment E-UTRA capability information element, the user equipment E-UTRA capability information element includes an E-UTRA capability setting field, and the E-UTRA capability setting field carries bandwidth combination capability information supported by the terminal except a bandwidth combination capability related to the NR cell.

Optionally, the wireless communication method further includes 704: Start the timer based on the quantity of RRC connection establishment failures of the NR cell, where the timer is further set to a third duration; and send the user equipment capability information message within the third duration, where the user equipment capability information message includes the user equipment E-UTRA capability information element, and the user equipment E-UTRA capability information element carries information that the terminal does not support E-UTRA and a new radio dual connectivity EN-DC.

For related details of 701 to 704, refer to related descriptions of 503 to 505 in FIGS. 5 and 601 to 604 in FIG. 6. Details are not described herein again.

705: Send an RRC connection reestablishment request message.

The terminal may send the RRC connection reestablishment request message to avoid establishing a connection to the NR cell.

Optionally, the wireless communication method further includes:

706: Send an SCG failure information message when receiving the RRC connection reconfiguration message, where the RRC connection reconfiguration message includes an NR secondary cell group configuration information element, and the NR secondary cell group configuration information element indicates to add the NR cell to an SCG.

If a network device still starts the blind configuration and indicates, based on the RRC connection reconfiguration message, the terminal to add the NR cell to the SCG, the network device may send the SCG failure information message to report an SCG failure in advance. Similarly, the network device may indicate to the terminal to maintain, change, or release the SCG. Generally, the network device indicates to change or release the SCG. Therefore, the terminal may terminate, based on an indication of the network device, the connection to the NR cell in advance.

Figure 8:
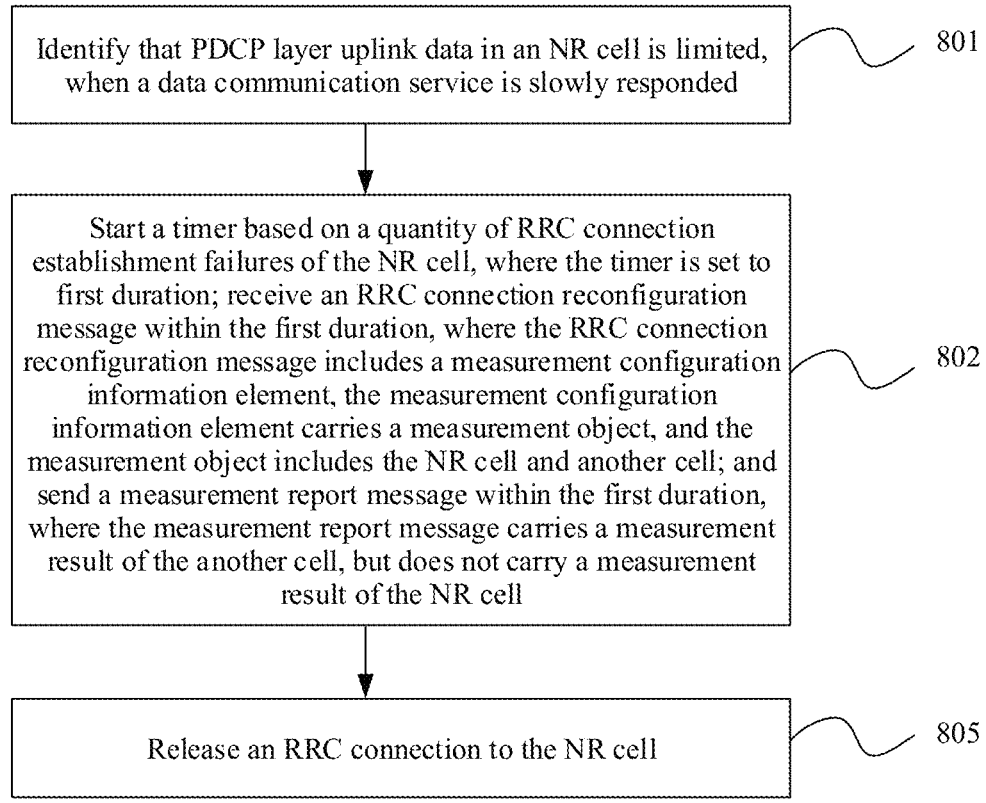
FIG. 8 is an example flowchart of a wireless communication method according to an embodiment of this application.

FIG. 8 provides a wireless communication method according to an embodiment of this application. The corresponding wireless communication method may be performed by a terminal device, or may be performed by a chip inside a terminal. As shown in FIG. 8, the wireless communication method includes the following steps.

801: Identify that PDCP layer uplink data in an NR cell is limited, when a data communication service is slowly responded.

Optionally, the wireless communication method further includes 802: Start a timer based on a quantity of RRC connection establishment failures of the NR cell, where the timer is set to a first duration; receive an RRC connection reconfiguration message within the first duration, where the RRC connection reconfiguration message includes a measurement configuration information element, the measurement configuration information element carries a measurement object, and the measurement object includes the NR cell and another cell; and send a measurement report message within the first duration, where the measurement report message carries a measurement result of the other cell, but does not carry a measurement result of the NR cell.

Optionally, the wireless communication method further includes 803: Start the timer based on the quantity of RRC connection establishment failures of the NR cell, where the timer is further set to a second duration; and send a user equipment capability information message within the second duration, where the user equipment capability information message includes a user equipment E-UTRA capability information element, the user equipment E-UTRA capability information element includes an E-UTRA capability setting field, and the E-UTRA capability setting field carries bandwidth combination capability information supported by the terminal except a bandwidth combination capability related to the NR cell.

Optionally, the wireless communication method further includes 804: Start the timer based on the quantity of RRC connection establishment failures of the NR cell, where the timer is further set to a third duration; and send the user equipment capability information message within the third duration, where the user equipment capability information message includes the user equipment E-UTRA capability information element, and the user equipment E-UTRA capability information element carries information that the terminal does not support E-UTRA and a new radio dual connectivity EN-DC.

For related details of 801 to 804, refer to related descriptions of 503 to 505 in FIGS. 5 and 601 to 604 in FIG. 6. Details are not described herein again.

805: Release an RRC connection to the NR cell.

The terminal terminates a connection to the NR cell by actively releasing the RRC connection to the NR cell, thereby ensuring better data service experience.

Figure 9:
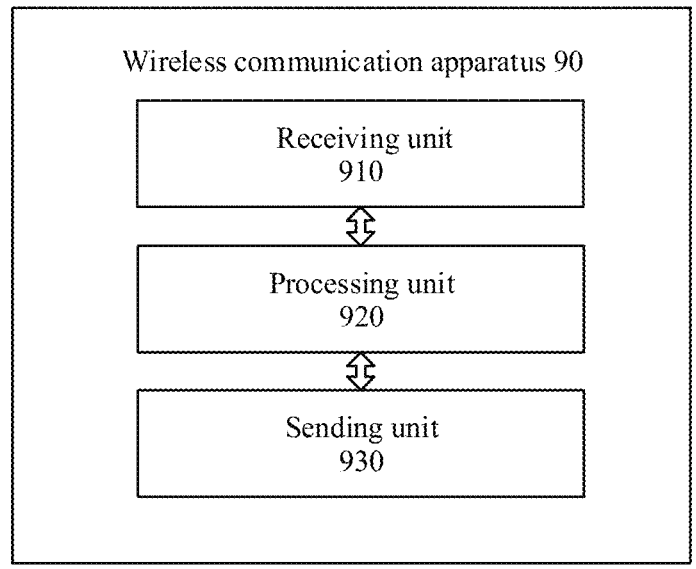
FIG. 9 is a schematic diagram of a structure of a wireless communication apparatus according to an embodiment of this application.

FIG. 9 is a schematic diagram of a structure of a wireless communication apparatus according to an embodiment of this application. The wireless communication apparatus may be a terminal, or may be a wireless communication apparatus applied inside a terminal; and the wireless communication apparatus may implement the related wireless communication method shown in any one of FIG. 5 to FIG. 8 and the foregoing optional embodiments. As shown in FIG. 9, the wireless communication apparatus 90 includes a receiving unit 910, a processing unit 920, and a sending unit 930.

The receiving unit 910 is configured to receive a first radio resource control (RRC) connection reconfiguration message, where the first RRC connection reconfiguration message includes a new radio (NR) secondary cell group configuration information element. The processing unit 920 is configured to start RRC connection establishment with an NR cell based on the first RRC connection reconfiguration message, where the NR cell is determined based on the NR secondary cell group configuration information element. The processing unit 920 is further configured to start a timer based on a quantity of RRC connection establishment failures of the NR cell, where the timer is set to a first duration. The receiving unit 910 is further configured to receive a second RRC connection reconfiguration message within the first duration, where the second RRC connection reconfiguration message includes a measurement configuration information element, the measurement configuration information element carries a measurement object, and the measurement object includes the NR cell and another cell. The sending unit 930 is configured to send a measurement report message within the first duration, where the measurement report message carries a measurement result of the other cell, but may not carry a measurement result of the NR cell.

The quantity of RRC connection establishment failures of the NR cell includes one or more times of a quantity of random access failures of the NR cell, a quantity of times that a packet loss rate of PDCP layer uplink data of the NR cell exceeds a second threshold, and the like.

It should be understood that the wireless communication apparatus in embodiments of this application may be implemented by software, for example, a computer program or instructions having the foregoing functions, and the corresponding computer program or the corresponding instructions may be stored in a memory inside the terminal. A processor reads the corresponding computer program or the corresponding instructions in the memory to implement the foregoing functions. Alternatively, the wireless communication apparatus in embodiments of this application may be implemented by hardware. The receiving unit 910 is a receiver, the processing unit 920 is a processor, and the sending unit 930 is a transmitter. The sending unit 930 and the receiving unit 910 of the terminal may be a same physical entity or different physical entities. When the sending unit 930 and the receiving unit 910 are the same physical entity, the sending unit 930 and the receiving unit 910 may be collectively referred to as a transceiver unit or a transceiver. Alternatively, the wireless communication apparatus in embodiments of this application may be implemented by a combination of a processor and a software module.

Figure 10:
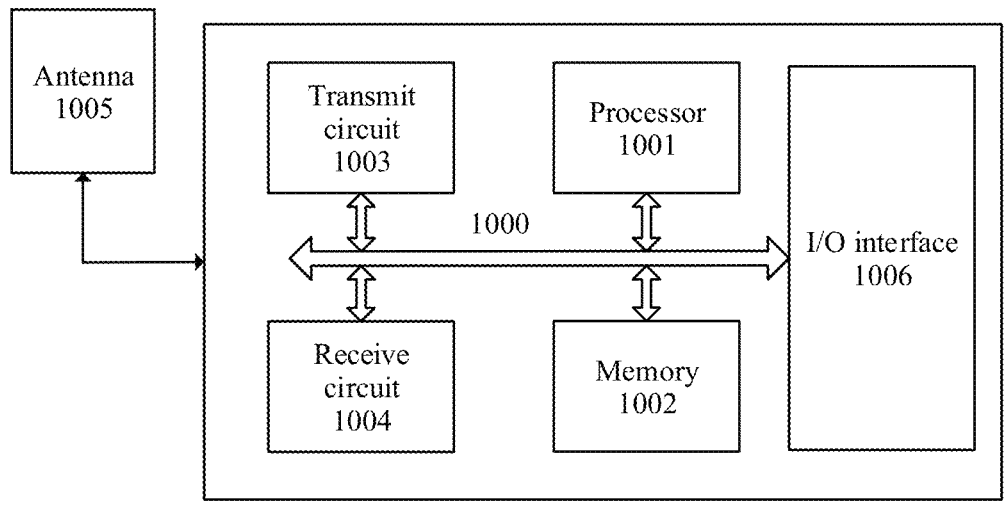
FIG. 10 is a schematic diagram of a structure of a wireless communication apparatus according to an embodiment of this application.

FIG. 10 is a schematic diagram of a structure of a wireless communication apparatus according to an embodiment of this application. The wireless communication apparatus may be a wireless communication apparatus or a terminal in the embodiments of this application, and may implement the wireless communication method shown in any one of FIG. 3 or FIG. 8 and the foregoing optional embodiments. As shown in FIG. 10, the wireless communication apparatus 100 includes a processor 1001, and a memory 1002 coupled to the processor 1001. It should be understood that only one processor and one memory are shown in FIG. 10. The wireless communication apparatus 100 may include another quantity of processors and memories.

The memory 1002 is configured to store a computer program or computer instructions. The computer program or the computer instructions may be classified into two types based on functions. When one type of computer program or instructions is executed by the processor 1001, the wireless communication apparatus 100 is enabled to implement the steps performed by the terminal in the wireless communication method in the embodiments of this application. This type of computer program or instructions may be denoted as terminal function programs. For example, the terminal function programs may include program code for implementing the wireless communication method shown in FIG. 3.

In addition, the wireless communication apparatus 100 may further include a connection line 1000, a transmit circuit 1003, a receive circuit 1004, an antenna 1005, an input/output (I/O) interface 1006, and the like. The transmit circuit and the receive circuit may be coupled to the antenna, to connect to another communication device in a wireless manner. The transmit circuit and the receive circuit may alternatively be integrated into a transceiver, and the antenna may be a radio frequency antenna supporting a plurality of frequencies. The I/O interface allows a possibility of interacting with another communication device or a user. For example, for a base station, the I/O interface may be a common public radio interface (CPRI), an Ethernet interface, a USB interface, or the like. For the terminal, the I/O interface may be a screen, a keyboard, a microphone, a speaker, a USB interface, or the like. Components inside the wireless communication apparatus 100 may be coupled together through various connection cables (for example, a bus system). In addition to a data bus, the bus system may further include a power bus, a control bus, a status signal bus, and the like. However, for clear description, various types of buses in this specification are marked as the bus system.

It may be understood that the processor 1001 and the memory 1002 may be implemented by using a processing unit and a storage unit instead, where the processing unit and the storage unit may be implemented as hardware or hardware plus software having a corresponding function. The storage unit is configured to store program instructions, and the processing unit is configured to execute the program instructions in the storage unit, to implement the related wireless communication method shown in any one of FIG. 5 to FIG. 8 and the foregoing optional embodiments.

Figure 11:
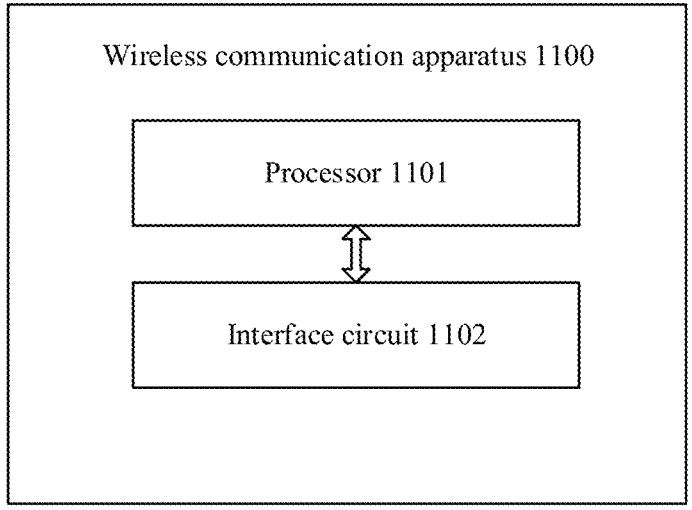
FIG. 11 is a schematic diagram of a structure of a wireless communication apparatus according to an embodiment of this application.

FIG. 11 is a schematic diagram of a structure of a wireless communication apparatus according to an embodiment of this application. The wireless communication apparatus may be a wireless communication apparatus or a terminal in the embodiments of this application, and may implement the wireless communication method shown in any one of FIG. 3 or FIG. 8 and the foregoing optional embodiments. As shown in FIG. 11, the wireless communication apparatus 1100 includes a processor 1101, and an interface circuit 1102 coupled to the processor 1101. It should be understood that only one processor and one interface circuit are shown in FIG. 11. The wireless communication apparatus 1100 may include another quantity of processors and interface circuits.

The interface circuit 1102 is configured to communicate with another component of the terminal, for example, a memory or another processor. The processor 1101 is configured to perform signal interaction with another component through the interface circuit 1102. The interface circuit 1102 may be an input/output interface of the processor 1101.

For example, the processor 1101 reads, through the interface circuit 1102, a computer program or instructions in a memory coupled to the processor 1101, and decodes and executes the computer program or the instructions. It should be understood that the computer program or the instructions may include the foregoing terminal function programs, or may include a foregoing function program of the wireless communication apparatus applied to the terminal. When the corresponding function program is decoded and executed by the processor 1101, the terminal or the wireless communications apparatus in the terminal may implement the solutions in the wireless communications method provided in the embodiments of this application.

Optionally, these terminal function programs are stored in a memory outside the wireless communication apparatus 110. When the terminal function programs are decoded and executed by the processor 1101, the memory temporarily stores some or all content of the terminal function programs.

Optionally, these terminal function programs are stored in a memory inside the wireless communication apparatus 110. When the terminal function programs are stored in the memory inside the wireless communication apparatus 110, the wireless communication apparatus 110 may be disposed in the terminal of the wireless communication system in the embodiments of this application.

Optionally, some content of the terminal function programs is stored in the memory outside the wireless communication apparatus 110, and other content of the terminal function programs is stored in the memory inside the wireless communication apparatus 110.

It should be understood that the wireless communication apparatuses shown in any one of FIG. 9 to FIG. 11 may be combined with each other, and reference may be made to related design details of the wireless communication apparatuses shown in any one of FIG. 9 to FIG. 11 and the optional embodiments. Reference may alternatively be made to the wireless communication method shown in any one of FIG. 5 or FIG. 8 and related design details of the optional embodiments. Details are not described herein again.

In the embodiments of this application and the accompanying drawings, the terms "first", "second", "third", "fourth", and the like are intended to distinguish between similar objects, but do not necessarily indicate a specific order or sequence. In addition, the terms "include", "have", and any other variants thereof are intended to indicate non-exclusive inclusions, for example, including a series of steps or units. The method, system, product, or device is not limited to the steps or units that are literally listed, but may include other steps or units that are not literally listed or that are inherent to these processes, methods, products, or devices.

It should be understood that in this application, "at least one" refers to one or more, and "a plurality of" refers to two or more. The term "and/or" is used to describe an association relationship between associated objects, and indicates that three relationships may exist. For example, "A and/or B" may represent the following three cases: Only A exists, only B exists, and both A and B exist, where A and B may be singular or plural. The character "/" usually indicates an "or" relationship between the associated objects. "At least item (piece) of the following" or a similar expression thereof means any combination of these items, including a single item (piece) or any combination of plural items (pieces). For example, at least one of a, b, or c may indicate a, b, c, a and b, a and c, b and c, or a, b, and c, where a, b, and c may be singular or plural.

It should be understood that sequence numbers of the foregoing processes do not mean execution sequences in this application. The execution sequences of the processes should be determined according to functions and internal logic of the processes, and should not be construed as any limitation on the implementation processes of the embodiments of this application. The term "coupling" mentioned in this application is used to indicate interworking or interaction between different components, and may include a direct connection or an indirect connection performed by using another component.

All or some of the foregoing embodiments of this application may be implemented by using software, hardware, firmware, or any combination thereof. When the software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, or an optical fiber) or wireless (for example, infrared, radio, or microwave) manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape; or may be an optical medium, for example, a DVD; or may be a semiconductor medium, for example, a solid state disk (SSD).

In the embodiments of this application, the memory is a device or a circuit that has a data or information storage capability, and may provide instructions and data for the processor. The memory includes a read-only memory (ROM), a random access memory (RAM), a non-volatile random access memory (NVRAM), a programmable read-only memory, an electrically erasable programmable memory, a register, or the like.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application should be subject to the protection scope of the claims.

What is claimed is:

1. A wireless communication method applied to a terminal, wherein the terminal camps on an evolved universal terrestrial radio access (E-UTRA) cell, and the method comprises:
    receiving a first radio resource control (RRC) connection reconfiguration message, wherein the first RRC connection reconfiguration message comprises a new radio (NR) secondary cell group configuration information element;
    starting RRC connection establishment with an NR cell based on the first RRC connection reconfiguration message, wherein the NR cell is determined based on the NR secondary cell group configuration information element;
    starting a timer based on a quantity of RRC connection establishment failures of the NR cell, wherein the timer is set to a first duration;
    receiving a second RRC connection reconfiguration message within the first duration, wherein the second RRC connection reconfiguration message comprises a measurement configuration information element, the measurement configuration information element carries a measurement object, and the measurement object comprises the NR cell and another cell; and
    sending a measurement report message within the first duration in response to the second RRC connection reconfiguration message, wherein the measurement report message carries a measurement result of the other cell, but does not carry a measurement result of the NR cell.

2. The method according to claim 1, wherein the timer is further set to a second duration, and the method further comprises: sending a user equipment capability information message within the second duration, wherein the user equipment capability information message comprises a user equipment E-UTRA capability information element, the user equipment E-UTRA capability information element comprises an E-UTRA capability setting field, and the E-UTRA capability setting field carries bandwidth combination capability information supported by the terminal except a bandwidth combination capability related to the NR cell.

3. The method according to claim 2, wherein the timer is further set to a third duration, and the method further comprises: sending the user equipment capability information message within the third duration, wherein the user equipment capability information message comprises the user equipment E-UTRA capability information element, and the user equipment E-UTRA capability information element carries information that the terminal does not support E-UTRA and a new radio dual connectivity (EN-DC).

4. The method according to claim 1, further comprising:
    disabling, within the first duration, the timer when a signal quality of the NR cell is greater than a preset first threshold; and
    receiving the second RRC connection reconfiguration message, and sending a measurement report message that carries the measurement result of the NR cell after the timer is disabled.

5. The method according to claim 2, further comprising:
    disabling, within the second duration, the timer when a signal quality of the NR cell is greater than a preset first threshold; and
    sending the user equipment capability information message that carries the bandwidth capability information supported by the terminal after the timer is disabled.

6. The method according to claim 3, further comprising:
    disabling, within the third duration, the timer when a signal quality of the NR cell is greater than a preset first threshold; and
    sending the user equipment capability information message that carries EN-DC capability information supported by the terminal after the timer is disabled.

7. The method according to claim 1, wherein the quantity of RRC connection establishment failures of the NR cell comprises at least one of the following:
    a quantity of random access failures of the NR cell and a quantity of times that a packet loss rate of packet data convergence protocol layer uplink data of the NR cell exceeds a second threshold.

8. The method according to claim 1, wherein before the starting the timer based on the quantity of RRC connection establishment failures of the NR cell, the method further comprises: sending a secondary cell group failure message.

9. The method according to claim 1, wherein before the starting the timer based on the quantity of RRC connection establishment failures of the NR cell, the method further comprises: releasing an RRC connection to the NR cell.

10. The method according to claim 1, wherein before the starting the timer based on the quantity of RRC connection establishment failures of the NR cell, the method further comprises: sending an RRC connection reestablishment request message, wherein the RRC connection reestablishment request message is used to request RRC connection reestablishment.

11. A wireless communication apparatus applied to a terminal, wherein
    the terminal camps on an evolved universal terrestrial radio access (E-UTRA) cell, and the apparatus comprises:
    a transceiver and a processing circuit, wherein the transceiver includes a receiver, and a transmitter, wherein:
    the receiver is configured to receive a first radio resource control (RRC) connection reconfiguration message, wherein the first RRC connection reconfiguration message comprises a new radio (NR) secondary cell group configuration information element;
    the processing circuit is configured to start RRC connection establishment with an NR cell based on the first RRC connection reconfiguration message, wherein the NR cell is determined based on the NR secondary cell group configuration information element;
    the processing circuit is further configured to start a timer based on a quantity of RRC connection establishment failures of the NR cell, wherein the timer is set to a first duration;
    the receiver is further configured to receive a second RRC connection reconfiguration message within the first duration, wherein the second RRC connection reconfiguration message comprises a measurement configuration information element, the measurement configuration information element carries a measurement object, and the measurement object comprises the NR cell and another cell; and the transmitter is configured to send a measurement report message within the first duration in response to the second RRC connection reconfiguration message, wherein the measurement report message carries a measurement result of the other cell but does not carry a measurement result of the NR cell.

12. The wireless communication apparatus according to claim 11, wherein the timer is further set to a second duration, and the transmitter is further configured to send a user equipment capability information message within the second duration, wherein the user equipment capability information message comprises a user equipment E-UTRA capability information element, the user equipment E-UTRA capability information element comprises an E-UTRA capability setting field, and the E-UTRA capability setting field carries bandwidth combination capability information supported by the terminal except a bandwidth combination capability related to the NR cell.

13. The wireless communication apparatus according to claim 12, wherein the timer is further set to a third duration, and the transmitter is configured to send the user equipment capability information message within the third duration, wherein the user equipment capability information message comprises the user equipment E-UTRA capability information element, and the user equipment E-UTRA capability information element carries information that the terminal does not support E-UTRA and a new radio dual connectivity (EN-DC).

14. The wireless communication apparatus according to claim 11, wherein the processing circuit is further configured to disable, within the first duration, the timer when a signal quality of the NR cell is greater than a preset first threshold;

the receiver is further configured to receive the second RRC connection reconfiguration message after the timer is disabled; and the transmitter is further configured to send a measurement report message that carries the measurement result of the NR cell after the timer is disabled and the second RRC connection reconfiguration message is received.

15. The wireless communication apparatus according to claim 12, wherein the processing circuit is further configured to disable, within the second duration, the timer when a signal quality of the NR cell is greater than a preset first threshold; and the transmitter is further configured to send the user equipment capability information message that carries the bandwidth capability information supported by the terminal after the timer is disabled.

16. The wireless communication apparatus according to claim 13, wherein the processing circuit is further configured to disable, within the third duration, the timer when a signal quality of the NR cell is greater than a preset first threshold; and the transmitter is further configured to send the user equipment capability information message that carries EN-DC capability information supported by the terminal after the timer is disabled.

17. The wireless communication apparatus according to claim 11, wherein the quantity of RRC connection establishment failures of the NR cell comprises at least one of the following:

a quantity of random access failures of the NR cell and a quantity of times that a packet loss rate of packet data convergence protocol layer uplink data of the NR cell exceeds a second threshold.

18. The wireless communication apparatus according to claim 11, wherein the transmitter is further configured to: before the timer is started based on the quantity of RRC connection establishment failures of the NR cell, send a secondary cell group failure message.

19. The wireless communication apparatus according to claim 11, wherein the processing circuit is further configured to: before the timer is started based on the quantity of RRC connection establishment failures of the NR cell, release an RRC connection to the NR cell.

20. A non-transitory computer-readable storage medium, wherein the non-transitory computer-readable storage medium stores program code, and when the program code is executed by a terminal or a processor in a terminal, the method according to claim 1 is implemented.

* * * * *

UNITED STATES PATENT AND TRADEMARK OFFICE
CERTIFICATE OF CORRECTION

| | |
|---|---|
| PATENT NO. | : 12,108,477 B2 |
| APPLICATION NO. | : 17/669792 |
| DATED | : October 1, 2024 |
| INVENTOR(S) | : Yuanyuan Liu et al. |

It is certified that error appears in the above-identified patent and that said Letters Patent is hereby corrected as shown below:

In the Specification

In Column 1, Line 8, delete "Aug. 15, 2019. the" and insert -- Aug. 15, 2019, the --.

Signed and Sealed this
Tenth Day of December, 2024

Katherine Kelly Vidal
*Director of the United States Patent and Trademark Office*